United States Patent
Li et al.

(10) Patent No.: US 12,224,578 B2
(45) Date of Patent: Feb. 11, 2025

(54) SOURCE CIRCUIT AND POWER SUPPLY AND ELECTRIC SYSTEM

(71) Applicant: Tridonic GmbH & Co KG, Dornbirn (AT)

(72) Inventors: Xinhai Li, Shenzhen Guangdong (CN); Yaofeng Lin, Shenzhen Guangdong (CN); Zongjie Wu, Shenzhen Guangdong (CN); Harald Netzer, Nenzing (AT)

(73) Assignee: Tridonic GmbH & Co KG, Dornbirn (AT)

( * ) Notice: Subject to any disclaimer, the term of this patent is extended or adjusted under 35 U.S.C. 154(b) by 81 days.

(21) Appl. No.: 17/772,256

(22) PCT Filed: Nov. 25, 2019

(86) PCT No.: PCT/CN2019/120636
§ 371 (c)(1),
(2) Date: Apr. 27, 2022

(87) PCT Pub. No.: WO2021/102634
PCT Pub. Date: Jun. 3, 2021

(65) Prior Publication Data
US 2022/0376492 A1    Nov. 24, 2022

(51) Int. Cl.
*H02H 9/00* (2006.01)
*H05B 45/52* (2020.01)

(52) U.S. Cl.
CPC ............ *H02H 9/002* (2013.01); *H05B 45/52* (2020.01)

(58) Field of Classification Search
CPC .............................. H02H 9/002; H05B 45/52
See application file for complete search history.

(56) References Cited

U.S. PATENT DOCUMENTS

| | | | | |
|---|---|---|---|---|
| 9,237,617 | B1* | 1/2016 | Xiong | H05B 45/14 |
| 2008/0107285 | A1* | 5/2008 | Chou | H02H 9/002 |
| | | | | 381/94.5 |
| 2013/0082615 | A1* | 4/2013 | Williams | H05B 45/52 |
| | | | | 315/186 |

(Continued)

FOREIGN PATENT DOCUMENTS

| | | |
|---|---|---|
| CN | 104466900 A | 3/2015 |
| CN | 205039698 U | 2/2016 |

(Continued)

OTHER PUBLICATIONS

English translation of Abstract of Foreign Application CN-110460029-A (Year: 2019).*

(Continued)

*Primary Examiner* — Jared Fureman
*Assistant Examiner* — Michael J Warmflash
(74) *Attorney, Agent, or Firm* — Andrus Intellectual Property Law, LLP (57) ABSTRACT

A source circuit, a power supply and an electric system. The source circuit includes at least one voltage source supplied from a mains circuit and used to provide at least one voltage for at least one device and at least one switch respectively connected to the at least one voltage source and controlled to be turned on according to a voltage of the mains circuit and/or at a timing after the mains circuit being applied corresponding to the device.

14 Claims, 5 Drawing Sheets

(56) References Cited

U.S. PATENT DOCUMENTS

| | | | | |
|---|---|---|---|---|
| 2014/0035462 A1* | 2/2014 | Kumada | ............... | H05B 45/38 |
| | | | | 315/127 |
| 2017/0303369 A1* | 10/2017 | Thosteson | .............. | H05B 47/16 |
| 2018/0206306 A1* | 7/2018 | Thosteson | .............. | H05B 47/16 |
| 2018/0226785 A1* | 8/2018 | Asanza Maldonado | ..................... | |
| | | | | H02H 3/42 |
| 2018/0367057 A1* | 12/2018 | Calicchio | ............... | H02H 3/087 |
| 2021/0175811 A1* | 6/2021 | Lin | ......................... | H02M 1/36 |

FOREIGN PATENT DOCUMENTS

| | | | |
|---|---|---|---|
| CN | 206323526 U | | 7/2017 |
| CN | 104466900 B | * | 12/2017 |
| CN | 110460029 A | * | 11/2019 |
| JP | 2002330538 A | | 11/2002 |

OTHER PUBLICATIONS

English translation of Abstract of Foreign Application CN-104466900-B (Year: 2017).*
PCT/CN2019/120636, International Search Report and Written Opinion dated Aug. 27, 2020, 9 pages.

* cited by examiner

SOURCE CIRCUIT AND POWER SUPPLY AND ELECTRIC SYSTEM

CROSS REFERENCE TO RELATED APPLICATIONS

The present application is the U.S. national stage application of international application PCT/CN2019/120636 filed Nov. 25, 2019, which international application was published on Jun. 3, 2021 as International Publication WO 2021/102634 A1.

TECHNICAL FIELD OF THE INVENTION

Embodiments of the present disclosure generally relate to the field of electrical apparatus, and more particularly to a source circuit, a power supply and an electric system.

BACKGROUND OF THE INVENTION

This section introduces aspects that may facilitate better understanding of the present disclosure. Accordingly, the statements of this section are to be read in this light and are not to be understood as admissions about what is in the prior art or what is not in the prior art.

In many applications, the inrush current may limit the number of devices with per power supply, such as a LED driver, switching mode power supply, server power supply, telecommunication power supply, charger, adapter, a power of home appliance, etc.

For example, the inrush current is the mains current drawn by the device when the mains voltage is applied and the internal capacitances such as input filter and ECAP are charged. Depending on these capacitances the inrush current is in the range of several tens of amps. The major part of the inrush current is caused by the ECAP. When several devices are connected to the mains, the total inrush current sums up to several hundreds of amps. This total inrush current limits the number of devices that can be connected to a single circuit breaker.

In order to limit the inrush current, there are two existing solutions. The first solution is to add a NTC resistor on the mains. The second solution is to add a switch and a resistor connected to the capacitance. The switch is turned on only after the capacitance is charged through the resistor. Therefore, the resistor limits the inrush current through the capacitance.

SUMMARY OF THE INVENTION

Inventors of this disclosure found that there exists some problems in the above two existing solutions. In the first solution, it is only effective at cold start, and the NTC resistor may cause high loss and reduce the efficiency of the device. In the second solution, high power loss on the resistor during the startup and when the switch is damaged, the resistor may be over heated. Furthermore, the cost is high.

In general, embodiments of the present disclosure provide a source circuit, a power supply and an electric system. In the embodiments, a switch connected to a voltage source is controlled to be turned on according to a voltage of the mains circuit and/or at a timing after the mains circuit being applied corresponding to the device. Therefore, the device is connected to the voltage source at a low input voltage to limit the inrush current, and/or the device is connected to the power supply at a timing corresponding to the device, thus the inrush currents corresponding to different devices appear at different timings then the total inrush current is limited. Furthermore, only a switch is needed and the cost is reduced.

In a first aspect, there is provided a source circuit, including: at least one voltage source supplied from a mains circuit and used to provide at least one voltage for at least one device; and at least one switch respectively connected to the at least one voltage source and controlled to be turned on according to a voltage of the mains circuit and/or at a timing after the mains circuit being applied corresponding to the device.

In an embodiment, the switch is turned on when the voltage of the mains circuit is zero or a minimum value.

In an embodiment, the voltage of the mains circuit is detected by a controller.

In an embodiment, the timing is a random value corresponding to the device.

In an embodiment, the timing is a random value in a predetermined period corresponding to the device.

In an embodiment, the predetermined periods corresponding to different devices are different or overlapped.

In an embodiment, the timing is predetermined or determined by a controller.

In an embodiment, the switch is a transistor.

In a second aspect, there is provided a power supply, including: a mains circuit; the source circuit according to the first aspect; and a controller used to directly or indirectly control the at least one switch of the source circuit according to a voltage of the mains circuit and/or at a timing after the mains circuit being applied corresponding to the device.

In an embodiment, the controller is further used to detect the voltage of the mains circuit.

In an embodiment, the controller is further used to predetermine or determine the timing corresponding to the device.

In an embodiment, the mains circuit is an AC mains circuit.

In a third aspect, there is provided an electric system, including: the power supply according to the second aspect; and at least one device connected to the power supply.

In an embodiment, at least two devices are connected to the power supply via corresponding switches of the source circuit of the power supply at different timings.

According to various embodiments of the present disclosure, a switch connected to a voltage source is controlled to be turned on according to a voltage of the mains circuit and/or at a timing after the mains circuit being applied corresponding to the device. Therefore, the device is connected to the voltage source at a low input voltage to limit the inrush current, and/or the device is connected to the power supply at a timing corresponding to the device, thus the inrush currents corresponding to different devices appear at different timings then the total inrush current is limited. Furthermore, only a switch is needed and the cost is reduced.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

First Embodiment

A source circuit is provided in a first embodiment.

The power supply circuit includes: at least one voltage source supplied from a mains circuit and used to provide at least one voltage for at least one device; and at least one switch respectively connected to the at least one voltage source and controlled to be turned on according to a voltage of the mains circuit and/or at a timing after the mains circuit being applied corresponding to the device.

In an embodiment, the source circuit includes one or more voltage source and switch, and the number of the voltage source and switch may be determined according to actual requirements.

The source circuit includes one voltage source and switch and the source circuit includes several voltage sources and switches are illustrated respectively below.

Figure 1:
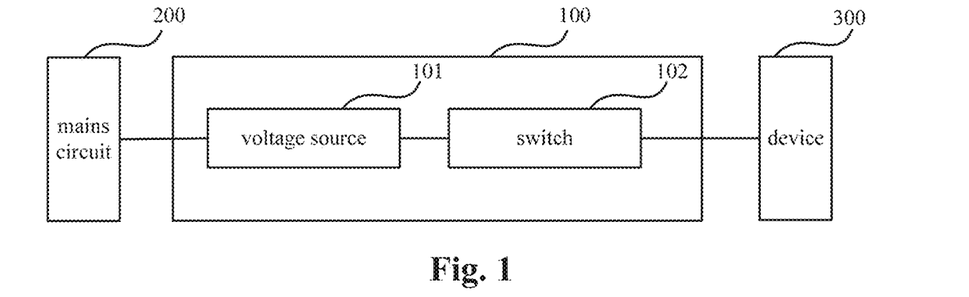
FIG. 1 is a diagram of a source circuit with an embodiment of the present disclosure.

FIG. 1 is a diagram of a source circuit with an embodiment of the present disclosure. As shown in FIG. 1, a source circuit 100 includes:

a voltage source 101 supplied from a mains circuit 200 and used to provide a voltage for a device 300; and a switch 102 connected to the voltage source 101 and controlled to be turned on according to a voltage of the mains circuit 200 and/or at a timing after the mains circuit 200 being applied corresponding to the device 300.

In an embodiment, the voltage source 101 is supplied from the mains circuit 200, and provide the voltage for the device 300. The constructions and functions of the voltage source 101 may be similar to those in the related art.

For example, the voltage source 101 includes an input filter and capacitances to be charged.

In an embodiment, the device 300 may be any type of electric devices.

In an embodiment, the switch is a transistor. For example, the switch is a FET (Field Effect Transistor).

In an embodiment, the switch 102 is controlled by a controller.

In an embodiment, the controller may be any type of controller. For example, the controller is a microcontroller unit (MCU).

In an embodiment, the switch 102 is controlled to be turned on according to a voltage of the mains circuit 200.

For example, the switch 102 is turned on when the voltage of the mains circuit 200 is zero or a minimum value.

In an embodiment, the mains circuit 200 is an AC mains circuit.

When the mains circuit is the AC mains circuit, the switch 102 is turned on when the voltage of the mains circuit 200 is zero, that is, the switch 102 is turned on when the phase of the mains circuit 200 is zero.

When the mains circuit is a rectified AC mains circuit, the switch 102 is turned on when the voltage of the mains circuit 200 is the minimum value.

In an embodiment, the voltage of the mains circuit is detected by the controller.

The methods for detecting the voltage of the mains circuit may be similar to those in the related art, and more details of these parts shall not be described herein any further.

In an embodiment, the switch 102 is controlled to be turned on at a timing after the mains circuit 200 being applied corresponding to the device 300.

The timing is corresponding to the device 300.

For example, the timing is a random value corresponding to the device.

For example, the timing is a random value in a predetermined period corresponding to the device. For example, the predetermined period is corresponding to a serial number of the device, which is stored in the controller.

In an embodiment, the timing is predetermined or determined by the controller.

For example, during commissioning of the installation, the timing is predetermined according to the device and stored in the device or the controller.

For example, during the service stage, the timing is determined by the controller.

Figure 2:
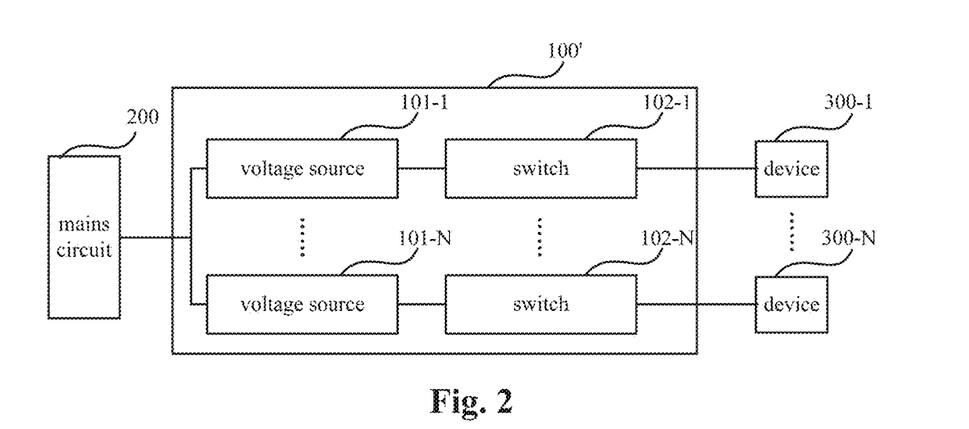
FIG. 2 is another diagram of a source circuit with an embodiment of the present disclosure.

FIG. 2 is another diagram of a source circuit with an embodiment of the present disclosure. As shown in FIG. 2, a source circuit 100' includes:

a plurality of voltage sources 101-1~101-N supplied from a mains circuit 200 and used to provide voltages for devices 300-1~300-N respectively; and a plurality of switches 102-1~102-N connected to the voltage sources 101-1~101-N and controlled to be turned on according to a voltage of the mains circuit 200 and/or at timings after the mains circuit 200 being applied corresponding to the devices 300-1~300-N.

In an embodiment, N being an integer great than or equal to 2.

In an embodiment, the voltage sources 101-1~101-N are similar to the voltage source 101.

The device 300 may be any type of electric devices.

In an embodiment, the switches 102-1~102-N are controlled by a controller.

In an embodiment, the controller may be any type of controller. For example, the controller is a microcontroller unit (MCU).

In an embodiment, the switch 102 is controlled to be turned on according to a voltage of the mains circuit 200.

For example, the switches 102-1~102-N are turned on when the voltage of the mains circuit 200 is zero or a minimum value.

In an embodiment, the switches 102-1~102-N are respectively controlled to be turned on at timings after the mains circuit 200 being applied corresponding to the device 300.

The timings are corresponding to the devices 300-1~300-N.

For example, the timing is a random value corresponding to the device.

For example, the timings are a random values in predetermined periods corresponding to devices 300-1~300-N.

For example, the predetermined periods are corresponding to serial numbers of the devices 300-1~300-N, which are stored in the controller.

For another example, the predetermined periods are corresponding to addresses of the devices 300-1~300-N, which are stored in the devices respectively. For instance, when the source circuit is a DALI (Digital Addressable Lighting Interface) LED driver, the addresses are DALI addresses.

For example, the predetermined periods corresponding to different devices are different or overlapped.

Table 1 shows an example of the predetermined periods corresponding to different devices. As shown in table 1, different serial numbers of the devices are corresponding to different periods, which may be overlapped. The timings corresponding to the devices are random values in the corresponding periods. For example, the timing corresponding to the device whose last number of serial number is 0 is a random value in a range 150 ms~175 ms.

TABLE 1

| Last number of serial number | Minimum value of period (ms) | Maximum value of period (ms) |
| --- | --- | --- |
| 0 | 150 | 175 |
| 1 | 170 | 195 |
| 2 | 190 | 215 |
| 3 | 210 | 235 |
| 4 | 230 | 255 |
| 5 | 250 | 275 |
| 6 | 270 | 295 |
| 7 | 290 | 315 |
| 8 | 310 | 335 |
| 9 | 330 | 355 |

In an embodiment, the timings corresponding to the devices 300-1~300-N are predetermined or determined by the controller.

For example, during commissioning of the installation, the timings are predetermined as different values according to different devices and stored in the devices respectively or stored in the controller. Thus, the traffic on the communication interface can be reduced.

For example, during the service stage, the timings are determined as different values by the controller according to different devices.

That is, the devices are connected to the voltage sources at different timings.

As can be seen from the above embodiments, a switch connected to a voltage source is controlled to be turned on according to a voltage of the mains circuit and/or at a timing after the mains circuit being applied corresponding to the device. Therefore, the device is connected to the voltage source at a low input voltage to limit the inrush current, and/or the device is connected to the power supply at a timing corresponding to the device, thus the inrush currents corresponding to different devices appear at different timings then the total inrush current is limited. Furthermore, only a switch is needed and the cost is reduced.

Second Embodiment

A power supply is provided in a second embodiment.

Figure 3:
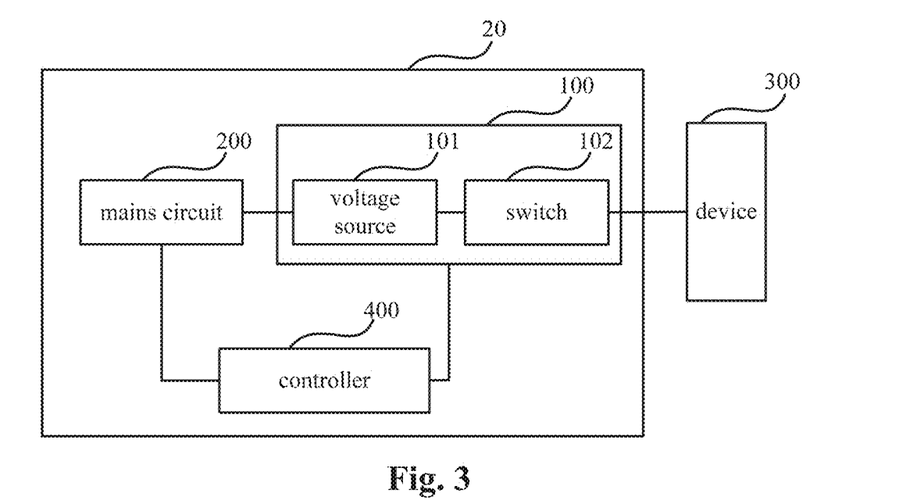
FIG. 3 is a diagram of a power supply with an embodiment of the present disclosure.

FIG. 3 is a diagram of a power supply with an embodiment of the present disclosure. As shown in FIG. 3, a power supply 20 includes:
- the mains circuit 200;
- the source circuit 100; and
- a controller 400 used to control the switch 102 of the source circuit 100 according to a voltage of the mains circuit 200 and/or at a timing after the mains circuit being applied corresponding to the device 300.

Figure 4:
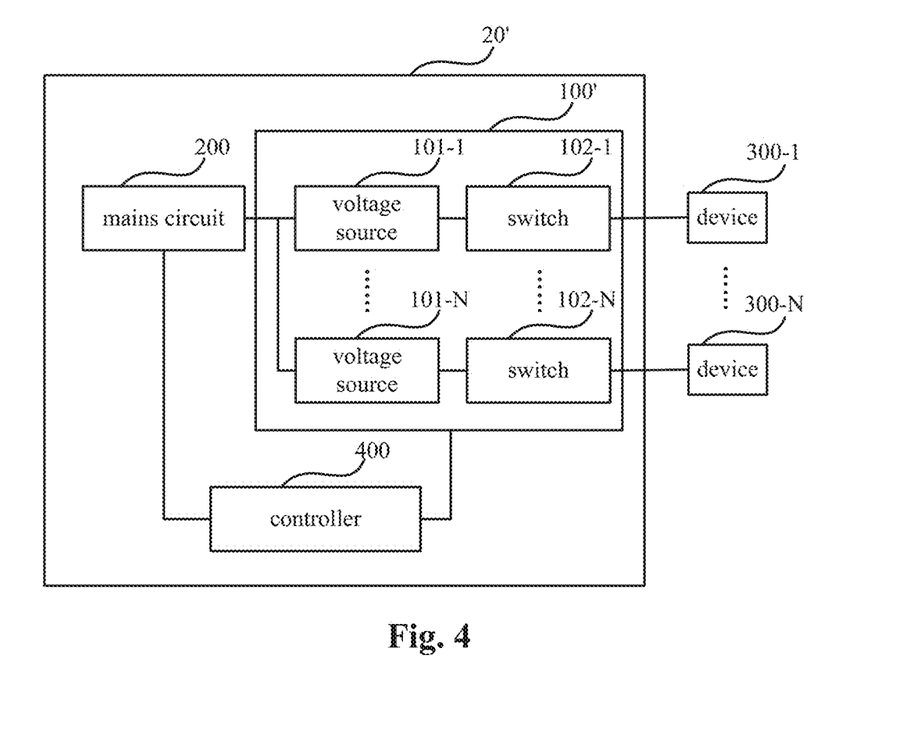
FIG. 4 is another diagram of a power supply with an embodiment of the present disclosure.

FIG. 4 is another diagram of a power supply with an embodiment of the present disclosure. As shown in FIG. 4, a power supply 20' includes:
- the mains circuit 200;
- the source circuit 100'; and
- a controller 400 used to directly or indirectly control the switches 102-1~102-N of the source circuit 100' according to a voltage of the mains circuit 200 and/or at timings after the mains circuit being applied corresponding to the devices 300-1~300-N.

In an embodiment, the power supply 20 or 20' may be any type of power supplies, such as a LED driver, switching mode power supply, server power supply, telecommunication power supply, charger, adapter, a power of home appliance, etc.

In an embodiment, the mains circuit 200 and the source circuit 100, 100' are identical to those described in the first embodiment, which shall not be described herein any further.

The controller 400 is used to control the switch 102 or the switches 102-1~102-N.

In an embodiment, the controller 400 is used to control the switch 102 of the source circuit 100 or the switches 102-1~102-N of the source circuit 100' according to a voltage of the mains circuit 200. In this case, the controller is further used to detect the voltage of the mains circuit 200.

In an embodiment, the controller 400 is used to directly or indirectly control the switch 102 of the source circuit 100 at a timing after the mains circuit being applied corresponding to the device 300 or control the switches 102-1~102-N of the source circuit 100' at timings after the mains circuit being applied corresponding to the device 300. In this case, the controller is further used to predetermine or determine the timing corresponding to the devices 300-1~300-N.

For example, the controller 400 determines the period corresponding to the device 300 and randomize the timing in the period or the periods corresponding to the devices 300-1~300-N and randomize the timings in the periods respectively.

The methods for determining the timing corresponding to the device 300 or the timings corresponding to the devices 300-1~300-N are identical to those described in the first embodiment, which shall not be described herein any further.

For example, when the controller 400 directly controls the switch 102 or the switches 102-1~102-N, the switch 102 or the switches 102-1~102-N are controlled by a switch on signal transmitted by the controller 400.

For example, when the controller 400 indirectly controls the switches 102-1~102-N, the controller 400 provide timing information or grouping information to the source circuit 100', and the source circuit 100' selects timing delay or switch according to the timing information or grouping information.

In this case, the controller 400 and the source circuit 100' may be connected as a wired network, e.g. a DALI system or a DMX system. Furthermore, the controller 400 and the source circuit 100' may be also connected as a wireless network, e.g. a WLAN or Bluetooth network.

The circuit configuration of the power supply 20 may be designed according to actual requirements. Here, an example of the circuit configuration of the power supply 20 is illustrated below.

Figure 5:
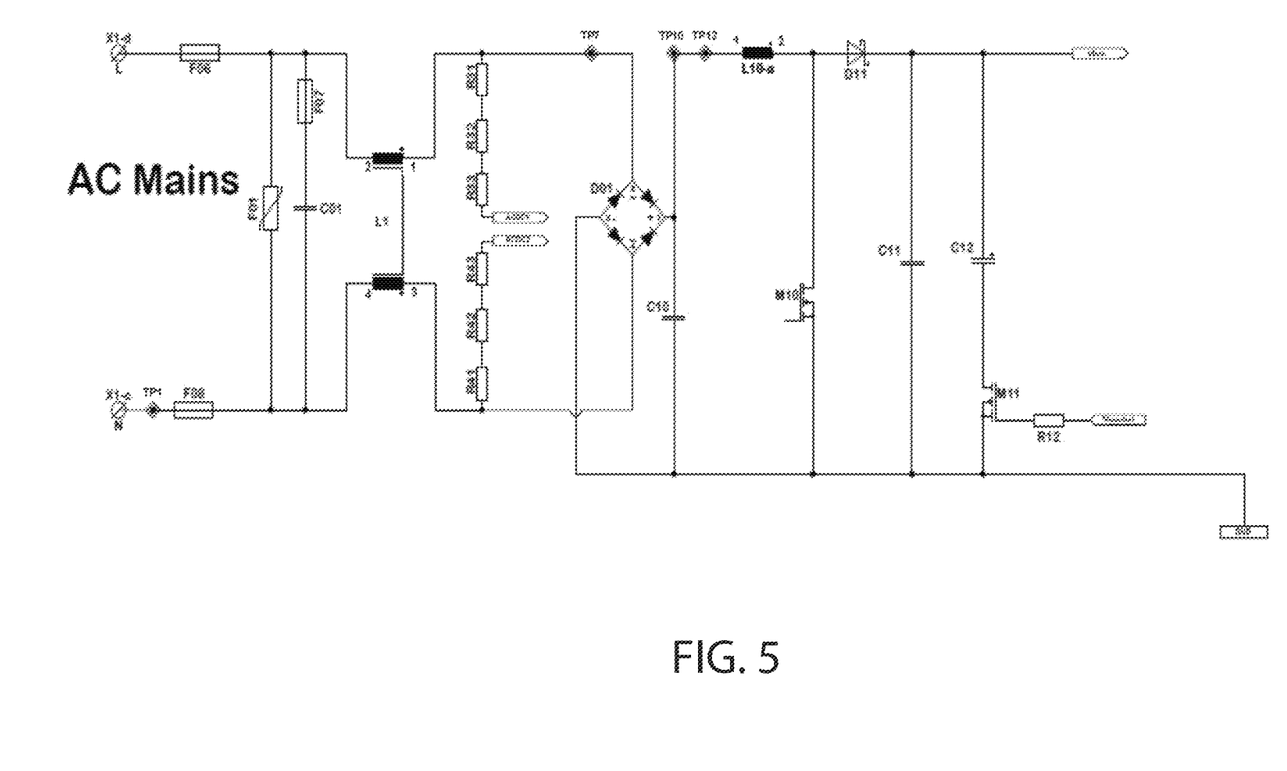
FIG. 5 is a circuit diagram of the power supply with an embodiment of the present disclosure.

FIG. 5 is a circuit diagram of the power supply with an embodiment of the present disclosure.

As shown in FIG. 5, the power supply includes a AC mains as the mains circuit 200, capacitances C11 and C12 as the voltage sources 101 (101-1~101-N) and a transistor M11 as the switch 102 (102-1~102-N).

In an embodiment, other constructions and functions of the power supply circuit may be similar to those in the related art, and more details of these parts shall not be described herein any further.

As can be seen from the above embodiments, a switch connected to a voltage source is controlled to be turned on according to a voltage of the mains circuit and/or at a timing after the mains circuit being applied corresponding to the device. Therefore, the device is connected to the voltage source at a low input voltage to limit the inrush current, and/or the device is connected to the power supply at a timing corresponding to the device, thus the inrush currents corresponding to different devices appear at different timings then the total inrush current is limited. Furthermore, only a switch is needed and the cost is reduced.

Third Embodiment

An electric system is provided in a third embodiment.

Figure 6:
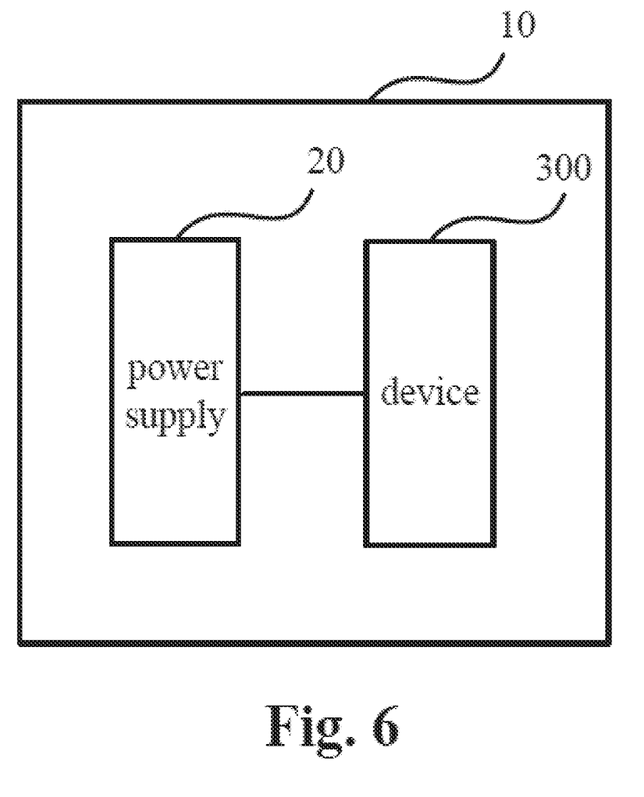
FIG. 6 is a diagram of an electric system with an embodiment of the present disclosure.

FIG. 6 is a diagram of an electric system with an embodiment of the present disclosure. As shown in FIG. 6, an electric system 10 includes:
  the power supply 20 according to the second embodiment; and
  the device 300 connected to the power supply 20.

Figure 7:
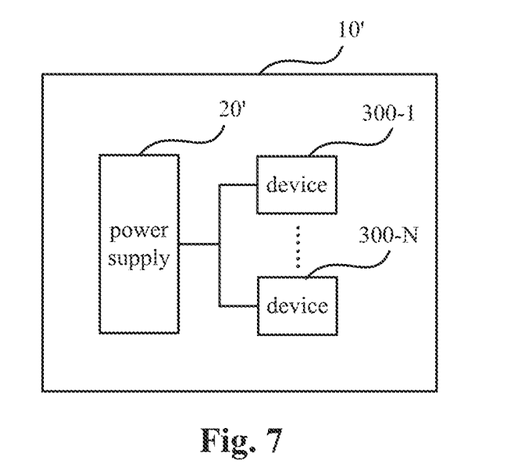
FIG. 7 is another diagram of an electric system with an embodiment of the present disclosure.

FIG. 7 is another diagram of an electric system with an embodiment of the present disclosure. As shown in FIG. 7, an electric system 10' includes:
  the power supply 20' according to the second embodiment; and
  the devices 300-1~300-N connected to the power supply 20'.

In an embodiment, the devices 300-1~300-N are connected to the power supply via corresponding switches of the source circuit of the power supply 20' at different timings.

The methods for determining the timing corresponding to the device 300 or the timings corresponding to the devices 300-1~300-N are identical to those described in the first embodiment, which shall not be described herein any further.

The device 300 and the devices 300-1~—300-N are any types of electric devices, such as a LED, a server, a telecommunication device, a home appliance, etc.

Figure 8:
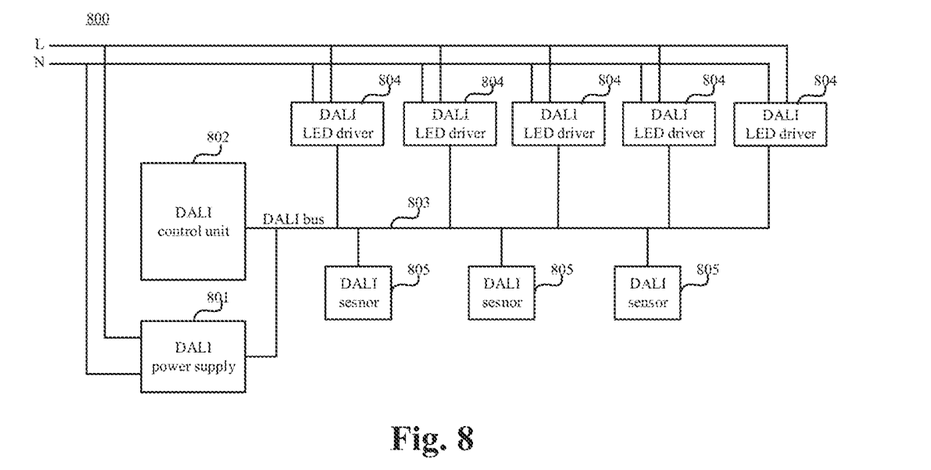
FIG. 8 is another diagram of an electric system with an embodiment of the present disclosure.

FIG. 8 is another diagram of an electric system with an embodiment of the present disclosure. The electric system is a DALI system. As shown in FIG. 8, a DALI system 800 includes: a DALI power supply 801, a DALI control unit 802, a DALI bus 803, several DALI LED drivers 804 and several DALI sensors 805.

The DALI control unit 802 provides timing information or grouping information to the DALI LED drivers 804 via the DALI bus 803, and the DALI LED drivers 804 select timing for being connected according to the timing information or grouping information.

As can be seen from the above embodiments, a switch connected to a voltage source is controlled to be turned on according to a voltage of the mains circuit and/or at a timing after the mains circuit being applied corresponding to the device. Therefore, the device is connected to the voltage source at a low input voltage to limit the inrush current, and/or the device is connected to the power supply at a timing corresponding to the device, thus the inrush currents corresponding to different devices appear at different timings then the total inrush current is limited. Furthermore, only a switch is needed and the cost is reduced.

Generally, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A source circuit, comprising:
  one or more voltage sources supplied from a mains circuit receiving AC power or rectified AC power, wherein each voltage source is configured to supply DC voltage to a device comprising one or more LEDs; and
  one or more switches respectively connected between the one or more voltage sources and the device to which the respective voltage source supplies DC voltage and wherein each switch is controlled to be turned on according to a timing, after the mains circuit is applied, corresponding to the device for which the respective voltage source is configured to supply DC voltage, and further wherein the timing is a random value corresponding to the respective device, and the random value timing for each switch is stored on the switch.

2. The source circuit according to claim 1, wherein the source circuit comprises multiple voltage sources and multiple switches.

3. The source circuit according to claim 2, wherein, the timing is in a predetermined period corresponding to the respective device, and the predetermined periods corresponding to different devices are different or overlapped.

4. A power supply comprising:
a mains circuit receiving AC power or rectified AC power; and
a source circuit according to claim 2 and multiple devices.

5. The source circuit according to claim 1, wherein the switch is a transistor.

6. The source circuit recited in claim 1 wherein each voltage source includes at least one capacitor to be charged.

7. A power supply comprising:
a mains circuit receiving AC power or rectified AC power; and
at least two source circuits according to claim 1 and at least two devices.

8. A power supply including:
a mains circuit receiving AC power or rectified AC power;
a source circuit comprising:
a plurality of voltage sources supplied from the mains circuit, wherein each voltage source is configured to supply DC voltage to a device comprising one or more LEDs, wherein the voltage sources are DALI LED drivers; and
a switch connected between each voltage source and the device to which the respective voltage source supplies DC voltage;
a DALI controller providing timing information after the mains circuit is applied for which the respective voltage supply is configured to supply DC voltage;
a DALI bus to which the DALI controller and the DALI LED drivers are connected; and
a DALI power supply connected to the mains circuit and supplying DC voltage to the DALI bus;
wherein the DALI controller provides the timing information to the DALI LED drivers via the DALI bus and the DALI LED drivers 804 connect to the mains circuit according to the timing information.

9. The power supply according to claim 8, wherein each switch is turned on when the voltage of the mains circuit is zero or a minimum value.

10. The power supply according to claim 8, wherein the DALI controller is further used to detect the voltage of the mains circuit.

11. The power supply according to claim 8, wherein the DALI controller is further used to predetermine or determine the timing information corresponding to the device.

12. The power supply according to claim 11, wherein, the DALI controller determines the period corresponding to the device and randomizes the timing in the period.

13. The power supply recited in claim 8 wherein each voltage source includes at least one capacitor to be charged.

14. The power supply recited in claim 8 wherein the switch is a transistor.

* * * * *